United States Patent Office 3,318,979
Patented May 9, 1967

3,318,979
PHOSPHOROUS ACID DERIVATIVES OF HEXA-CHLOROCYCLOPENTADIENE
Joseph M. Sandri, Chicago Heights, Ill., assignor to Standard Oil Company, Chicago, Ill., a corporation of Indiana
No Drawing. Filed Dec. 27, 1963, Ser. No. 334,037
3 Claims. (Cl. 260—956)

This invention relates to certain novel pentavalent phosphorus derivatives of hexachlorocyclopentadiene, and particularly to lubricant compositions containing such derivatives.

The development of the automobile transaxle by the automotive industry has introduced special problems into automotive lubrication. The transaxle is a unit which combines the transmission and rear axle hypoid gear mechanisms in a single housing. The transmission unit can be either of the manual shift or hydraulically controlled automatic types. It is desirable for engineering and economic reasons to combine the transmission and rear axle units in such a manner that the same lubricant can be used for both of these mechanisms. However, there are substantial differences in the lubricant requirements between manually shifted and hydraulically controlled automatic transaxle types.

The conventional automobile automatic transmissions are hydraulic torque transmitting devices which require substantially different lubricants from those used in conventional automobile manual transmissions and differentials. The automatic transmission requires a fluid lubricant which is of relatively low viscosity that does not vary considerably over a wide temperature range, and which is stable at relatively high temperatures. The hypoid gears of the differential have heretofore required extreme pressure additives in a fairly high viscosity lubricant. While conventional hypoid gear lubricants can be used as the single lubricant for manual shift transaxles, the automatic type transaxles require a lubricant that has all of the characteristics of an automatic transmission fluid plus the extreme pressure characteristics essential to satisfactory operation of hypoid gears. The present invention is therefore directed to the provisions of means for producing an automatic transaxle fluid that will function as a single lubricant for the automatic transmission and hypoid gear units in the transaxle.

The essential problem in the development of a transaxle fluid is, therefore, the production of the desired extreme pressure characteristics in an automatic transmission fluid without impairing the characteristics and function of the automatic transmission fluid. Adding a conventional extreme pressure agent to an automatic transmission fluid does not solve the problem because conventional extreme pressure agents are usually corrosive and can also act as pro-oxidants. Furthermore, conventional extreme pressure agents generally are incompatible with automatic transmission fluids, clutch plates and seals. A satisfactory extreme pressure agent must have superior extreme pressure properties, be oxidation stable, thermally stable, non-corrosive, and non-reactive and compatible with automatic transmission fluids, seals and clutch plates. The reader is referred to Hunstad et al.'s paper (and the literature cited) on "Developing Transaxle Fluid," presented at the January 1960 annual meeting of The Society of Automotive Engineers, and published in SAE Transactions, vol. 68, 1960, pp. 685–698, for more detailed information with respect to lubricants for hypoid gears, automatic transmissions, and transaxles.

A new class of compounds, hereinafter described, has been discovered which when added to automatic transmission fluids in small amounts produce lubricating fluids suitable for service as a single lubricant in automatic type transaxles. These new compounds can be classified as extreme pressure agents that are soluble in and compatible with automatic transmission fluids, non-reactive, and have the ability to impart the requisite extreme pressure property to such fluids.

The new class of extreme pressure agents which have been found to possess the desired qualities described above are certain phosphorous acid derivatives having the formula:

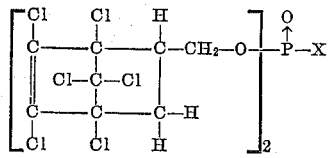

wherein X is a member of the group consisting of hydrogen and $C_{1-8}$ chloroalkyl. Representative chloroalkyl groups are chloromethyl, chloroethyl, chloropropyl, chlorobutyl, chloropentyl and chlorooctyl.

The herein described derivatives can be employed in amounts of from about 0.1 to about 10%, preferably 3 to 6%, by weight, in automatic transmission fluids to form transaxle fluids suitable for use as the single lubricant for automatic transaxle units. The term "transaxle fluid" as used in the description and claims refers to lubricating fluids consisting essentially of automatic transmission fluid and the new compounds of the present invention.

Automatic transmission fluids are well known in the art. Generally, they are petroleum base oils having a viscosity in the range of 35–100 SUS at 100° F. compounded with additives to provide the proper anti-oxidation, detergent, viscosity stability, viscosity index, pour point, clutch plate and seal compatibility, anti-rust, anti-squawk, anti-chatter and anti-foam properties.

An automatic transmission fluid consisting essentially of:

(1) About 72.1 weight percent of a petroleum base oil having a viscosity in the range of 35–100 SUS at 100° F.;

(2) About 3 weight percent of a polymethacrylate having an average viscosity of about 3700 SUS at 210° F.;

(3) About 17 weight percent of a polybutene having a mean molecular weight of about 1800 and an average viscosity of 15,000 SUS at 210° F.;

(4) About 6.8 weight percent of the oil-soluble reaction product prepared by the process comprising the steps of (a) reacting a butene polymer having an average molecular weight of 800 with about 15.5 weight percent of $P_2S_5$ at a temperature of about 450° F. for about 5.5 hours, (b) mixing the resultant reaction product with about 0.1 mole of polymeric linoleic acid having an average molecular weight of about 775, about 1.4 moles of boric acid, about 17.1 moles of methanol and about 1.6 moles of water and heating the resultant mixture at reflux temperature for about one hour, (c) adding to said mixture about 0.7 mole of zinc oxide and continuing heating the mixture at reflux temperature for about two hours, (d) adding to the partially neutralized reaction product thus obtained about 1.3 moles of barium oxide and continuing heating of the resultant mixture at reflux temperatures for about two hours, and (e) then heating the resultant mixture to about 350° F. to remove said water and methanol therefrom;

(5) About 0.1 weight percent of calcium sulfonate;

(6) About 0.5 weight percent of tertiary-$C_{12-18}$ alkyl primary amine; and (7) About 0.5 weight percent of 2,6-di-t-butyl-4-methylphenol was prepared to demonstrate the present invention. This fluid will be referred to in the examples following as ATF lubricant.

In the following examples illustrating the present invention, the extreme pressure properties of the transaxle fluid was determined by the SAE Extreme Pressure Method at 14 to 1 gear ratio, 100 r.p.m., with automatic loading. Oxidation stability of the transaxle fluids was determined by the Oven Oxidation Stability Test. In this test, 200 g. of the fluid is placed in a 400 ml. Griffith beaker. Ten inch lengths of 18 gauge copper wire and 20 gauge iron wire, each carefully polished with emery cloth and wound into approximately ½ inch diameter coils are placed in the fluid. The beaker is covered with a watch glass and stored in a thermostatically controlled oven at 275° F. for 100 hours. The sample is then removed and filtered through fluted filter paper. Visual examination is made for sludge formation, and condition of the copper and iron wires and filter paper. Any sludge formation or excessive corrosion of the wires constitutes a fail.

*Example 1*

A mixture of 315 g. (1.5 mole) diallylchloromethylphosphonate and 410 g. (1.5 mole) hexachlorocyclopentadiene was heated at 80° C. for 18 hours. Another 410 g. (1.5 mole) hexachlorocyclopentadiene was added to the reaction mixture and the resultant mixture heated at 100° C. for an additional 18 hours. Unreacted material was removed by distillation in vacuo giving 947 g. of a dark viscous material of structure

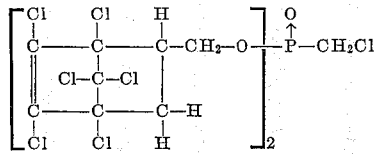

*Analysis.*—Calculated for $C_{17}H_{12}Cl_{13}PO_3$: Cl 61.0; P, 4.1. Found: Cl, 57.6; P, 5.26.

A transaxle fluid was prepared by dissolving 6 weight percent of the above derivative in the above described ATF lunbricant. The transaxle fluid passed the Oven Oxidation Stability Test. In the SAE extreme pressure (E.P.) test the transaxle fluid carried a load of 375 pounds, whereas the ATF lubricant carried only 90 pounds.

Another transaxle fluid containing 4 weight percent of the above derivative in the ATF lubricant passed the Oldsmobile 26A Double-Bump Test. This is a well known differential gear test developed by General Motors wherein the E.P. properties of the lubricant are determined in full scale passenger car road tests.

*Example 2*

A mixture of 662 g. (2.0 mole) hexachloronorbornenylmethanol (allyl alcohol adduct of hexachlorocyclopentadiene) and 138.1 g. (1 mole) diethylhydrogen phosphite was heated to 150° C. when ethanol started distilling. Heating of the mixture was continued with continuous removal of the ethanol formed to 185° C. After cooling, 724 g. of a viscous liquid product was obtained of structure

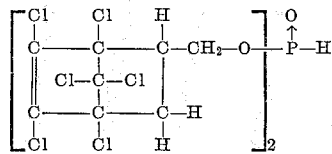

*Analysis.*—Calculated for $C_{16}H_{11}Cl_{12}PO_3$: Cl, 60.2; P, 4.38. Found: Cl, 56.3; P, 3.04.

A transaxle fluid consisting of 6 weight percent of the above derivative in the ATF lubricant passed the SAE E.P. test at 355 pounds and the Oven Oxidation Stability Test.

The above examples demonstrate that the new class of phosphorus derivatives described herein are effective extreme pressure agents. Further, that transaxle fluids suitable for use as a single lubricant in automatic type transaxle units can be simply produced by the simple addition of a member of the new class of compounds of the invention to an automatic transmission fluid.

Unless otherwise stated, percentages given herein and in the claims are weight percentages.

Thus, having described the invention, the invention claimed is:

1. A phosphorous acid derivative having the formula:

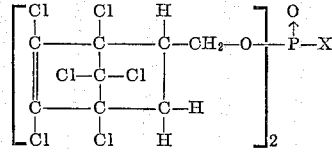

wherein X is a member of the group consisting of hydrogen and $C_{1-8}$ chloroalkyl.

2. The compound having the formula

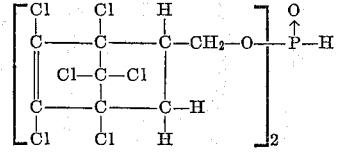

3. The compound having the formula

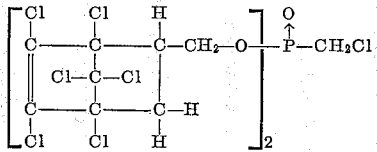

No references cited.

CHARLES B. PARKER, *Primary Examiner.*

RICHARD L. RAYMOND, *Assistant Examiner.*